United States Patent

Bartucci et al.

[15] 3,655,260

[45] Apr. 11, 1972

[54] SIMULATOR HAVING AN INFINITE-DEPTH-OF-FIELD OPTICAL PICKUP

[72] Inventors: John F. Bartucci, Tallmadge; James A. Horton, Munroe Falls, both of Ohio

[73] Assignee: Goodyear Aerospace Corporation, Akron, Ohio

[22] Filed: July 24, 1970

[21] Appl. No.: 58,131

Related U.S. Application Data

[63] Continuation-in-part of Ser. No. 772,960, Nov. 4, 1968, abandoned.

[52] U.S. Cl. ....................................350/45, 350/47, 350/50, 350/181, 350/214, 350/216, 353/69, 355/52

[51] Int. Cl. ....................................................G02b 23/02

[58] Field of Search ..................................350/8, 45–47, 54, 350/181; 353/69, 70; 355/52

[56] References Cited

UNITED STATES PATENTS

| | | | |
|---|---|---|---|
| 2,354,614 | 7/1944 | Reason | 353/70 |
| 2,171,360 | 8/1939 | Strang | 350/46 |
| 3,076,271 | 2/1963 | Marvin et al. | 350/181 UX |
| 3,508,822 | 4/1970 | Cornell et al. | 353/69 |

*Primary Examiner*—John K. Corbin
*Attorney*—J. G. Pere and L. A. Germain

[57] ABSTRACT

An optical pickup having a final imaging lens with means for tilting the final lens about its rear nodal point to maintain registration of the optimum image plane resulting from varying object plane orientations. This technique increases the depth of field without affecting the *f*-number of the optical pickup system or introducing distortions.

3 Claims, 6 Drawing Figures

Patented April 11, 1972 3,655,260

3 Sheets-Sheet 1

INVENTORS
JOHN F. BARTUCCI
JAMES A. HORTON
BY:
Oldham & Oldham
ATTORNEYS

INVENTORS
JOHN F. BARTUCCI
JAMES A. HORTON
BY:
Oldham & Oldham
ATTORNEYS

INVENTORS
JOHN F. BARTUCCI
JAMES A. HORTON
BY:
Oldham & Oldham
ATTORNEYS

SIMULATOR HAVING AN INFINITE-DEPTH-OF-FIELD OPTICAL PICKUP

This application is a continuation-in-part of our earlier application Ser. No. 772,960, filed Nov. 4, 1968, now abandoned, for a SIMULATOR HAVING INFINITE DEPTH OF FIELD OPTICAL PICKUP.

Sufficient depth of field is an inherent problem in all conventional optical pickup designs. The solution in the past has been to operate at high $f$-numbers and accept the decreased resolution and increased object-lighting requirements.

The general object of the present invention is to increase the depth of field without affecting the $f$-number of the pickup or introducing distortions. A more specific object of the invention is to provide an optical pickup system which will increase the depth of field without affecting the $f$-number of the pickup which utilizes the tilting of the final imaging lens about its rear nodal point to compensate for the final image tilt with a resolution of more than 60 lines per millimeter on axis.

The aforesaid objects of the present invention and other objects which will become apparent as the description proceeds are achieved by providing in an optical pickup system, the combination of a primary image plane, a focus lens to collimate images formed on the primary plane, a final imaging lens to receive images from the focus lens, and a final image plane to receive images from the final imaging lens which is characterized by a means pivotally mounting the final imaging lens for pivotal action in all planes about its nodal point.

For a better understanding of the invention reference should be had to the accompanying drawings wherein.

Figure 1:
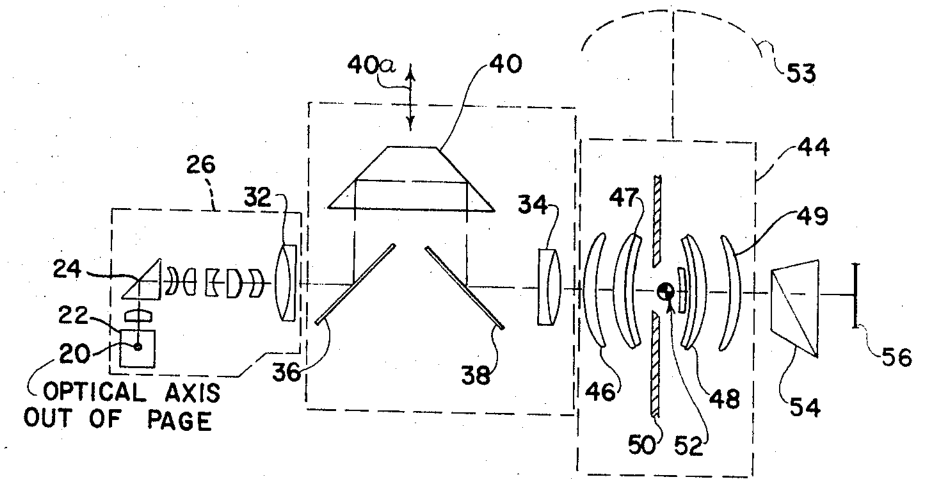
FIG. 1 is a schematic diagram of an optical system comprising the preferred embodiment of the invention.
Figure 4:
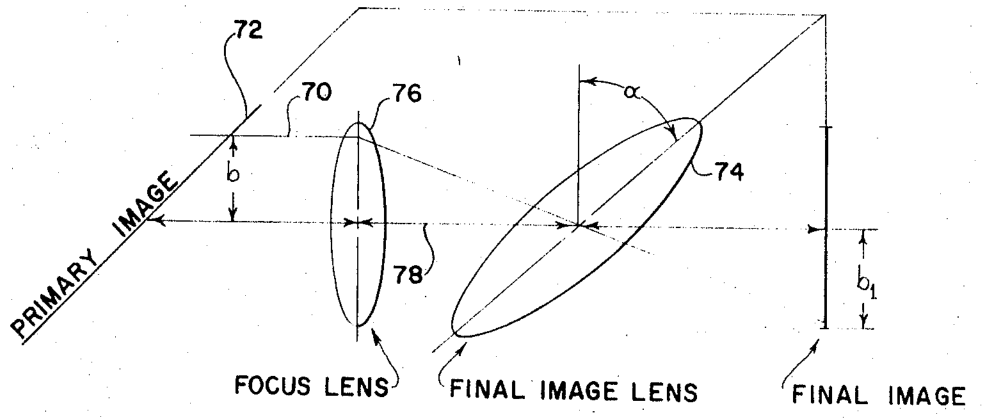
Figure 5:
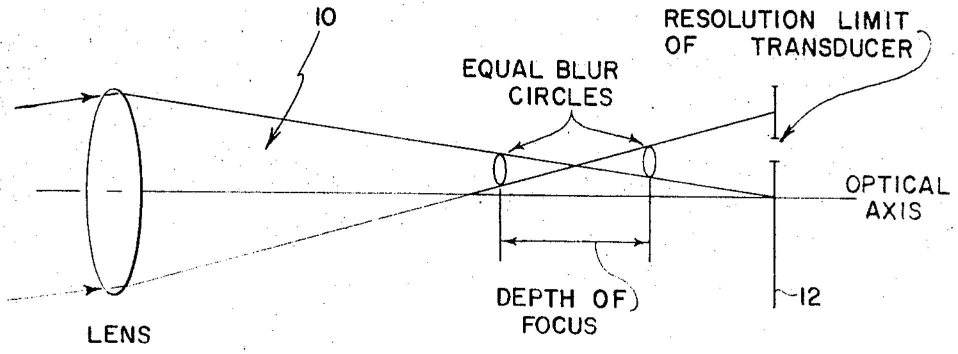
Figure 6:
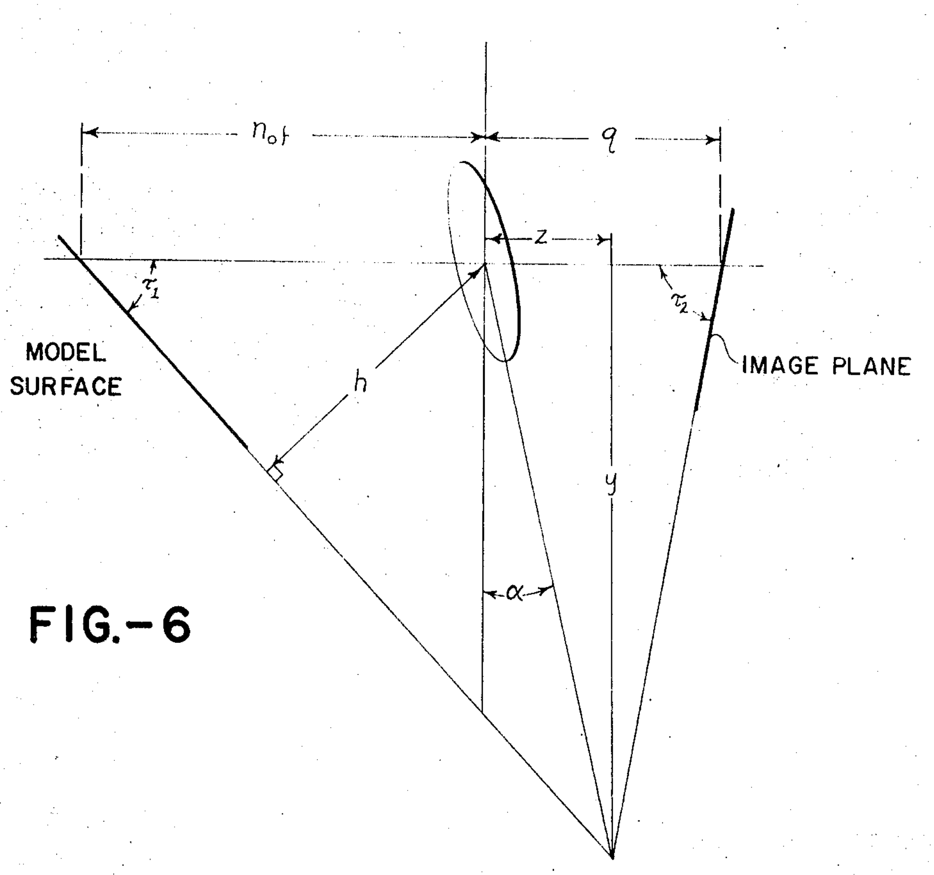

FIG. 4 schematically illustrates the embodiment of the invention shown in FIG. 1 of the drawings;

FIG. 5 is a schematic drawing to illustrate the depth of field problem inherent in this type of optical system; and FIG. 6 is a schematic illustration of the derivation of the tilt angle computation.

Although the advantages of the optical pickup are numerous, operational usage reveals some serious limitations, the most prominent of which is the problem of obtaining sufficient depth of field. By definition, the depth of field is that distance in the object space over which satisfactory resolution can be obtained. It is dependent on essentially four factors:

1. a standard that is related to the resolution capacity of the image transducer—the circle of confusion, blus circle
2. the distance from the lens to the plane on which the lens is focused
3. the focal length of the lens system, and
4. the $f$-number—the focal length divided by the diameter of the aperture stop of the lens system.

Qualitatively, the depth of field increases as the object distance increases and as the focal length or aperture size decreases. The reasons for this response may be readily demonstrated. In FIG. 5, a ray bundle indicated generally by numeral 10, from some point in the object space is incident upon an image transducer 12 that is capable of resolving a finite number of lines per unit dimension of its sensitive surface. As the transducer is moved away from the point of best focus, the image will be degraded if the resulting blur circle is larger than the resolution limit of the transducer. The points at which the ray bundle diameter on the transducer is equal to the maximum acceptable blur circle of the optical system define the depth of focus, which may be readily transformed into the depth of field in the object space. In FIG. 5, as the lens is stopped down by decreasing the aperture size, the depth of focus and hence, the depth of field are increased.

It would seem that the depth of field could be increased without limit if the $f$-number were increased. However, the inclusion of the physical optics effects into the mathematical derivation shows that there are diffraction effects which will cause resolution degredation as $f$-number is increased. These are well known to the art, and hence as the $f$-numbers do increase, resolution decreases although not in a linear proportion until resolution becomes unacceptable.

CHARACTERISTICS OF THE IMAGE PLANE

In a conventional pickup, the near and far depths of field denote two planes that are perpendicular to the optical axis of the system. A scene will be within acceptable focus only if it lies within the boundaries defined by the near and far depths of field. At short object distances and small $f$-numbers, the total depth of field may become so shallow that only a small portion of the object is in focus.

The scenes generally viewed by the optical pickup of a flight simulator are planar in nature. Three-dimensional data usually are lacking or restricted to small buildings and trees. The problem is to increase substantially the quality of this predominantly planar information that is presented to the trainee.

For every point in the object space, there is a conjugate point in the image space. Since the object is generally a plane surface, the image is also planar. However, where the object plane is at an angle with respect to the lens plane, the lens forms an inclined image of the inclined object. The object, image, and lens planes must meet along a common line. This property, widely used in the rectification of aerial photographs is commonly known as the Scheimpflug condition.

The depth of field problem in conventional systems is a direct result of the tilt of this optimum-quality image, since the pickup device usually is perpendicular to the optical axis. Hence, the invention utilizes the Scheimpflug condition to achieve maximum depth of field in an optical system.

If a vidicon is incorporated to provide the object information, tilting of the vidicon is at best a formidable task and results in an incorrect image geometry. It would be preferable to correct for the image tilt by some other means. Since the object, image, and lens planes must meet along a common line, a rotation of the lens about its rear nodal point is the best answer to bring the image into perpendicularity with the optical axis of the system. The required lens tilt may be readily calculated. The lens initially is placed $n_o f$ away from the object. When the lens is rotated through the proper angle, the image plane tilt is given by $T_Z=90°$. To hold the axial magnification constant, the lens must be moved away from the object plane as it is rotated. This derivation is illustrated in FIG. 6.

SYSTEM IMPLEMENTATION

The system of FIG. 1 incorporates an optical axis 20 coming out of the page and passing through and into a right angle prism 24. The system illustrated in FIG. 1 of the drawings is manually controlled over all values of altitude and attitude to provide a completely workable system.

The objective lens 26 possesses several unique characteristics. It has a very short focal length, covers more than 80° full field, and has less than 10 percent barrel distortion at the field edge. The lens provides good imagery over a range of object distances from 1 inch in front of the prism 22 to infinity. The chief residual image error, the variation of astigmatism with object distance, was traced to a field lens 32, the primary purpose of which is minimize the distortion of the objective lens. Reducing the power and asphericity of the field lens 32 increased the overall distortion but improved the resolution of the lens. After refraction by the field lens 32, the chief rays of the system are approximately parallel to the optical axis. Thus, the primary image height is independent of object distance.

Objective lens (All indicated generally by dotted Block 26)—
(All dimensions in Inches)

| Surface | Radius | Thickness | Nd | V-no |
|---|---|---|---|---|

| | | | | |
|---|---|---|---|---|
| 1 | −1.8258 | 0.025 | 1.691 | 54.71 |
| 2 | 0.25 | 0.053 | 1.0 | – |
| 3 | ∞ | 0.29 | 1.691 | 54.71 |
| 4 | −0.4739 | 0.02 | 1.0 | – |
| 5 | ∞ | 0.42 | 1.62041 | 60.33 |
| 6 | ∞ | 0.0313 | 1.0 | – |
| 7 | −2.697 | 0.12 | 1.62041 | 60.33 |
| 8 | −0.5397 | 0.01 | 1.0 | – |
| 9 | 0.8129 | 0.1311 | 1.7552 | 27.58 |
| 10 | −2.1109 | 0.01 | 1.0 | – |
| 11 | 33.228 | 0.1178 | 1.62041 | 60.33 |
| 12 | 0.5364 | 0.1042 | 1.0 | – |
| 13 | 19.416 | 0.14 | 1.62041 | 60.33 |
| 14 | −0.5367 | 0.0551 | 1.0 | – |
| 15 | −0.401 | 0.08 | 1.62004 | 36.37 |
| 16 | −0.9542 | 0.9287 | 1.0 | – |
| 17 | 1.5432* | 0.33 | 1.62041 | 60.33 |
| 18 | −1.2821 | 0.125 | 1.64769 | 33.85 |
| 19 | −5.4025 | | | |

$$\text{*Aspheric Sag} = \frac{cy^2}{1+\sqrt{1-c^2y^2}} + .1322y^4 - .2763y^6$$

c = surface curvature
y = height off axis

The two mirrors, 36 and 38, and the right angle prism 40, provide the necessary offset to assure mechanical rotation about the prism 22.

The focus lens 34, an achromatic doublet, collimates the image formed by the objective lens. The lens corrects any residual aberation in the primary image thereby providing a well collimated image to the final imaging lens. Focusing action is obtained by displacing the prism 40 in such a manner as to maintain an optical path of one focal length between the focus lens 34 and the primary image.

Focus Lens (34)

| Surface | Radius | Thickness | Nd | V-no |
|---|---|---|---|---|
| 1 | 10.969 | 0.1562 | 1.64769 | 33.85 |
| 2 | 3.6592 | 0.3 | 1.55963 | 61.21 |
| 3 | −7.9847 | | | |

The final imaging lens, indicated by block 44, and comprising a plurality of individual lenses 46–49, forms the final image at its rear focal plane 56. The aperture stop 50 is also the system aperture stop. The final imaging lens 44 is mechanically mounted so as to be tiltable to any angle about its rear nodal point 52. The light passes through a derotation and roll prism 54 before the final image 56 is formed. The control of the tilt of the lens system 44 can be in any conventional manner through a gimbaled mounting thereof. The gimbaled mounting structure is schematically illustrated by number 53.

Final Imaging Lens (All indicated generally by dotted block 44)

| Surface | Radius | Thickness | Nd | V-no |
|---|---|---|---|---|
| 1 | 2.4012 | 0.5 | 1.62041 | 60.33 |
| 2 | 5.9011 | 0.01 | 1.0 | – |
| 3 | 2.3670 | 0.3 | 1.65844 | 50.88 |
| 4 | 3.76 | 0.152 | 1.66998 | 39.20 |
| 5 | 1.5776 | 1.0907 | 1.0 | – |
| 6 | −4.4485 | 0.15 | 1.62041 | 60.33 |
| 7 | −4.2979 | 0.7592 | 1.0 | – |
| 8 | −1.5654 | 0.2 | 1.64769 | 33.85 |
| 9 | −5.9177 | 0.51 | 1.67003 | 47.11 |
| 10 | −2.1961 | 0.01 | 1.0 | – |
| 11 | −11.804 | 0.55 | 1.62041 | 60.33 |
| 12 | −3.5166 | | | |

Aperture stop 0.65 inches before surface 6

ROTATION OF LENS ABOUT A NODAL POINT

Figure 2:
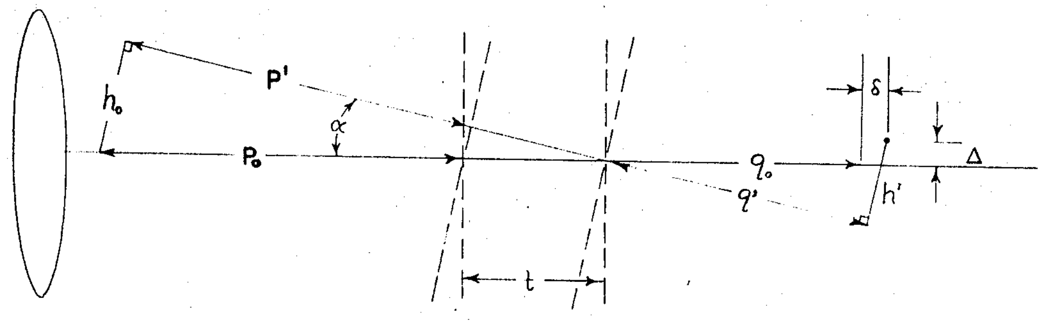
FIG. 2 is a schematic illustration and analysis of the angular relationship of the tilted lens and a finite nodal point separation.

The rotation of a lens about its rear nodal point may be used to erect an otherwise inclined image plane since the object lens, and image planes must meet along a common line. However, detailed analysis indicates at the image formed by the lens will move laterally as well as longitudinally as the lens is rotated. FIG. 2 illustrates the definitions necessary to consider this problem as follows:

$p_o$ = object distance of the axial point with no lens rotation
$q_o$ = image distance of the axial point with no lens rotation
$t$ = nodal point separation
$f$ = focal length of the lens
$p'$ = object distance of the axial point with the lens rotated
$q'$ = image distance of the axial point with the lens rotated
$\alpha$ = angle of lens rotation

TILTABLE FOCUSING LENS

Figure 3:
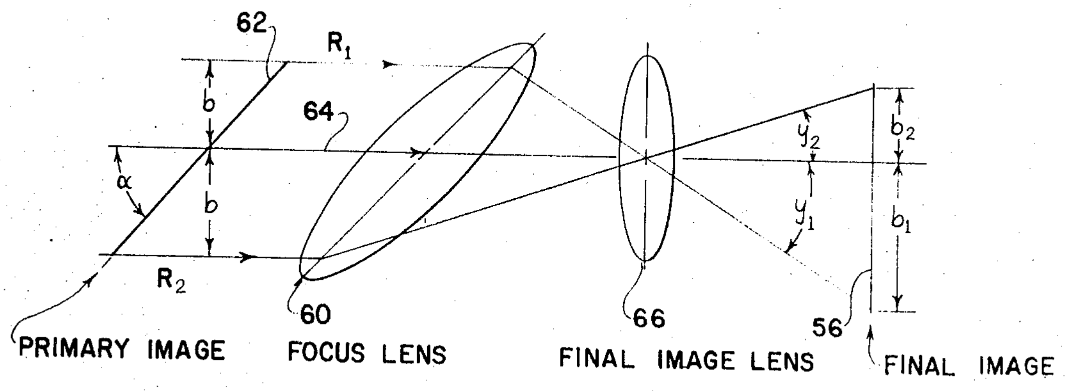
FIG. 3 illustrates schematically a modified embodiment of the invention which provides a tilted focusing lens.

FIG. 3 illustrates the focusing lens being tiltable, and shows that the lens plane indicated by numerals 60 must be parallel to the primary imaging plane 62 if the image is to be erect. However, this technique is not generally acceptable because anamorphic distortion is produced. In FIG. 3, R1 and R2 are two chief rays that pass through the primary image at equal heights above and below the axis 64. These rays are brought to focus at the center of the final imaging lens 66 and pass through undeviated, making the angles y1 and y2 with the optical axis. Obviously, $b_1$ is not equal to $b_2$ and anamorphic distortion is present.

TILTABLE FINAL-IMAGING LENS

Perspective is preserved as the final imaging lens is tilted or shifted laterally. In FIG. 4 a chief ray 70 passes through the primary image 72 at a height b and passes through the center of the final imaging lens 74 by focusing lens 76. To preserve the perspective, a final image height, $b_1$, must be directly proportional to $b$. A rotation of the final imaging lens through $\alpha$ makes the image, by definition, perpendicular to the optical axis 78. The fact that the image also recedes is of no concern at this point. The quantity $b_1/b$ is independent of ray height and thus correct perspective is maintained.

Image growth and recession, which is tilt-angle dependent, can be corrected by 1. making the final imaging-lens variable,
2. converging the light incident on e final imaging lens, or
3. adding a zoom lens between the final imaging lens and the vidicon to vary the image size properly. Thus, the tiltable final-imaging lens is the best method of implementing the Scheimpflug condition.

Constraints on lenses:

$0.05F_{34} < F_{26} < 0.1F_{34}$
$0.5F_{44} < F_{34} < 2.5F_{44}$
$0.5/f/ < F_{26} < 2.5/f/$ where $F_{26}$ = focal length of objective
$F_{34}$ = focal length of focus lens
$F_{44}$ = focal length of final imaging lens
$f$ = net system focal length
$f = F_{26}F_{44}/F_{34}$ While in accordance with the patent statutes, only the best known embodiments of the invention have been illustrated and described in detail, it is to be particularly understood that the invention is not limited thereto or thereby, but that the inventive scope is defined in the appended claims.

What is claimed is:

1. An optical pickup which comprises an objective lens, a focusing lens, a final imaging lens and means mounting the final imaging lens to tilt it in all planes about an axis through its rear nodal point where the focus lens and the final imaging lens are arranged with respect to each other so that the final image height on the final image plane is directly proportional to the input image height under all tilt conditions and where the objective lens is characterized by the following magnitudes: (all dimensions in inches)

| Surface | Radius | Thickness | Nd | V-no |
|---|---|---|---|---|
| 1 | −1.8258 | 0.025 | 1.691 | 54.71 |
| 2 | 0.25 | 0.053 | 1.0 | – |

| | | | | |
|---|---|---|---|---|
| 3 | ∞ | 0.29 | 1.691 | 54.71 |
| 4 | −0.4739 | 0.02 | 1.0 | – |
| 5 | ∞ | 0.42 | 1.62041 | 60.33 |
| 6 | ∞ | 0.0313 | 1.0 | – |
| 7 | −2.697 | 0.12 | 1.62041 | 60.33 |
| 8 | −0.5397 | 0.01 | 1.0 | – |
| 9 | 0.8129 | 0.1311 | 1.7552 | 27.58 |
| 10 | −2.1109 | 0.01 | 1.0 | – |
| 11 | 33.228 | 0.1178 | 1.62041 | 60.33 |
| 12 | 0.5364 | 0.1042 | 1.0 | – |
| 13 | 19.416 | 0.14 | 1.62041 | 60.33 |
| 14 | −0.5367 | 0.0551 | 1.0 | – |
| 15 | −0.401 | 0.08 | 1.62004 | 36.37 |
| 16 | −0.9542 | 0.9287 | 1.0 | – |
| 17 | 1.5432* | 0.33 | 1.62041 | 60.33 |
| 18 | −1.2821 | 0.125 | 1.64769 | 33.85 |
| 19 | −5.4025 | | | |

$$*\text{Aspheric Sag}=\frac{cy^2}{1+\sqrt{1-c^2y^2}}+.1322y^4-.2763y^6$$

$c$ = surface curvature
$y$ = height off axis

2. A pickup according to claim 1 which includes a derotation, or roll, prism between the final imaging lens and the final imaging plane and where the focus lens

| Surface | Radius | Thickness | Nd | V-no |
|---|---|---|---|---|
| 1 | 10.969 | 0.1562 | 1.64769 | 33.85 |
| 2 | 3.6592 | 0.3 | 1.55963 | 61.21 |
| 3 | −7.9847 | | | |

3. An optical system according to claim 1 where the objective lens covers more than 80° full field, and has less than 10 percent barrel distortion at the field edge, while, at the same time, is telecentric, and where the final imaging lens

| Surface | Radius | Thickness | Nd | V-no |
|---|---|---|---|---|
| 1 | 2.4012 | 0.5 | 1.62041 | 60.33 |
| 2 | 5.9011 | 0.01 | 1.0 | – |
| 3 | 2.3670 | 0.3 | 1.65844 | 50.88 |
| 4 | 3.76 | 0.152 | 1.66998 | 39.20 |
| 5 | 1.5776 | 1.0907 | 1.0 | – |
| 6 | −4.4485 | 0.15 | 1.62041 | 60.33 |
| 7 | −4.2979 | 0.7592 | 1.0 | – |
| 8 | −1.5654 | 0.2 | 1.64769 | 33.85 |
| 9 | −5.9177 | 0.51 | 1.67003 | 47.11 |
| 10 | −2.1961 | 0.01 | 1.0 | – |
| 11 | −11.804 | 0.55 | 1.62041 | 60.33 |
| 12 | −3.5166 | | | |

Aperture stop 0.65 inches before surface 6

* * * * *